Sept. 6, 1927.　　　　　　　　　　　　　　　　　　　　1,641,257
J. W. FAY
APPARATUS FOR HANDLING AND SEVERING ARTICLES
Filed Oct. 29, 1925　　　　2 Sheets-Sheet 1
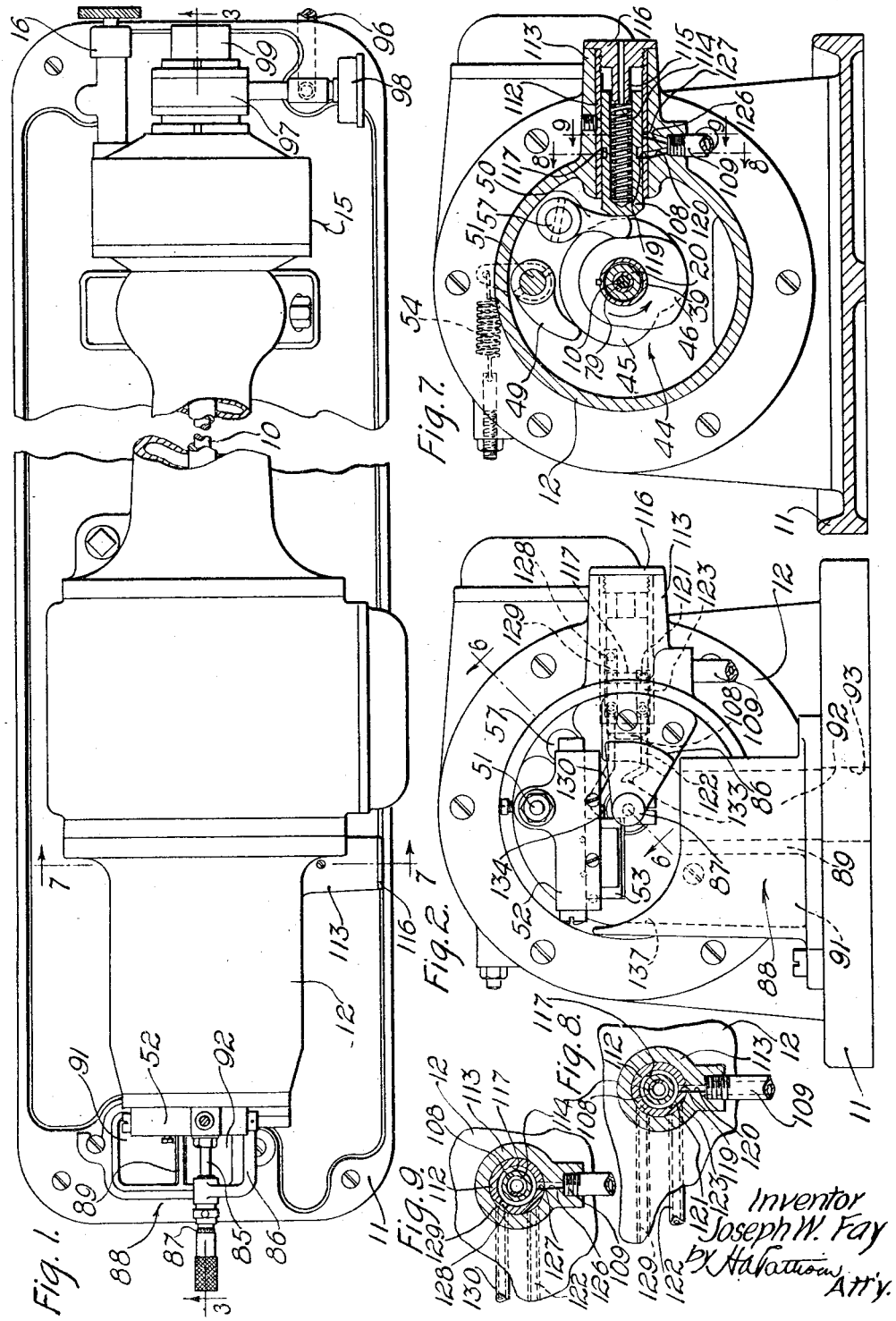

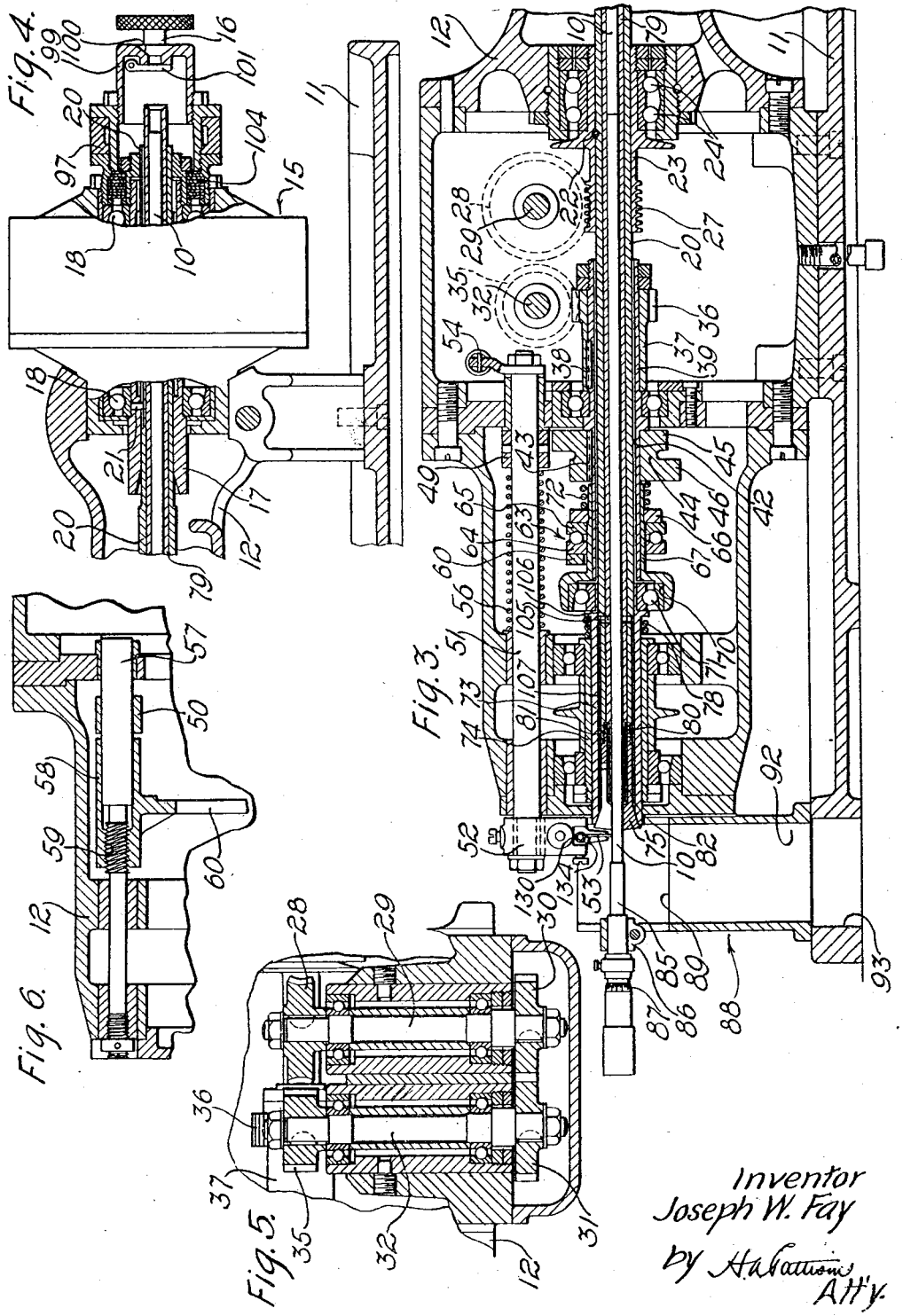

Patented Sept. 6, 1927.

1,641,257

UNITED STATES PATENT OFFICE.

JOSEPH WILLIAM FAY, OF VILLA PARK, ILLINOIS, ASSIGNOR TO WESTERN ELECTRIC COMPANY, INCORPORATED, OF NEW YORK, N. Y., A CORPORATION OF NEW YORK.

APPARATUS FOR HANDLING AND SEVERING ARTICLES.

Application filed October 29, 1925. Serial No. 65,649.

This invention relates to an apparatus for handling and severing articles, and more particularly to an apparatus for severing vulcanized rubber rods or tubes into lengths.

The primary object is the provision of an improved apparatus for rapidly and efficiently performing the operations incident to the handling and severing of articles.

In accordance with one embodiment thereof, the present invention contemplates the provision of an apparatus designed to receive a length of comparatively easily severed stock which is intermittently and automatically advaced a predetermined distance, depending on the length desired, by means of compressed air applied against the stock substantially parallel to the direction of travel thereof, the advanced stock being automatically and intermittently rotated and thereby severed. According to the preferred form the air employed for advancing the stock is heated previously to its application, thereby sufficiently changing the condition of the stock to not only permit a large number of cutting operations before it is necessary to resharpen or replace the cutting tool but also enables the cutting tool to sever the stock accurately. To insure continuous operation of the apparatus, it is equipped with mechanism responsive to the movement of a preceding length of stock to indicate to an operator when it has passed a particular point that another length of stock may be introduced into the apparatus.

Other objects and advantages of the invention will more fully appear from the following detailed description taken in connection with the accompanying drawings which illustrate one embodiment thereof, and in which Fig. 1 is a fragmentary plan view of an apparatus embodying the features of this invention;

Fig. 2 is an enlarged end view thereof looking toward the right;

Figs. 3 and 4, when combined with Fig. 4 at the right of Fig. 3, show an enlarged fragmentary vertical sectional view on the line 3—3 of Fig. 1 looking in the direction of the arrows;

Fig. 5 is a detail sectional plan view of a portion of the gear drive;

Fig. 6 is a detail sectional view on the line 6—6 of Fig. 2, looking in the direction of the arrows;

Fig. 7 is an enlarged vertical sectional view on the line 7—7 of Fig. 1, looking in the direction of the arrows, and Figs. 8 and 9 are detail sectional views on the lines 8—8 and 9—9 respectively of Fig. 7 looking in the direction of the arrows with the parts shown in another position in Fig. 9.

The embodiment of the invention shown in the accompanying drawings is adapted to cut tubes or other stock into sections of predetermined lengths, the stock in the present instance comprising a vulcanized rubber tube or rod which is indicated in the drawing by the reference numeral 10.

Referring to the drawings, particularly to Figs. 1 and 2, 11 indicates a base plate which may be suitably supported upon a bench or table (not shown). Secured to the plate 11 is a frame or housing 12 supporting at the right end (Figs. 1 and 4) an air driven turbine motor 15 of any well known type. The speed of the motor 15 is controlled by a suitable valve 16, the inlet port of which is connected to a suitable source of compressed air supply (not shown). The outlet port of the valve is adapted to direct the air against the usual turbine rotor, a projecting sleeve-like portion 17 of which is indicated in Fig. 4. The sleeve 17 is rotatably journaled upon suitable ball bearings 18 mounted in the frame of the motor 15 which in turn are suitably mounted in the housing 12. Rotatably journaled in the housing 12 is a sleeve 20, which as indicated at 21 (Fig. 4) is pinned to the sleeve portion 17 of the turbine rotor. Adjacent its right end (Fig. 3) the sleeve 20 is pinned as indicated at 22 to a comparatively short sleeve 23 rotatably journaled in the frame 12 upon ball bearings 24, its left end being journaled in a manner to be hereinafter described. Formed upon the periphery of the sleeve 23 at its left end is a worm 27 which meshes with a worm wheel 28 (Figs. 3 and 5) secured to one end of a suitably journaled shaft 29, the opposite end of the shaft 29 having fixed thereto a gear 30 meshing with a gear 31 fixed to one end of a shaft 32, the opposite end thereof carrying a spiral gear 35. The spiral gear 35 meshes with a spiral gear 36 secured by a key 38 to the right end of a sleeve 39 immediately surrounding the periphery of the sleeve 20 but with a suitable clearance, as indicated at 42, to prevent friction therebetween. It will readily be apparent that upon rotation of the sleeve 20 the sleeve 39 will be rotated at a slower rate of speed and in the same direction. The relative speeds of rotation of the sleeves 20 and 39 are adapted to be changed by varying the ratio between the gears 30 and 31, as will readily be understood. Secured to the sleeve 39 by a key 43 is a cam wheel 44 provided with a pair of cam faces 45 and 46, as clearly shown in Fig. 7, which are adapted to engage levers 49 and 50 respectively in a predetermined sequence. The lever 49 is pinned to one end of a rock shaft 51 suitably journaled in the housing 12, the oppostie end of the shaft 51 extending outside of the housing and having fixed thereto a cutter carrier or clamping block 52 for supporting a cutting blade 53. The blade 53 as shown in Fig. 2 is in its normal or inoperative position. One arm of the lever 49 is attached to one end of a coiled tension spring 54, the opposite end of the spring being suitably secured to the frame 12. The spring functions to retain the lever 49 in contact with the cam face 45 at all times. It will be apparent that as the cam 44 is rotated in the direction indicated by the arrow (Fig. 7) the cutting blade 53 will be rocked alternately in counter-clockwise and clockwise directions, as viewed in Fig. 2.

A coiled tension spring 56 (Fig. 3) around the shaft 51 between the lever 49 and the frame 12 serves to maintain the cutting edge of the blade 53 always in a predetermined position. The lever 50 is pinned to one end of a rock shaft 57 (Figs. 2, 6 and 7) which is suitably journaled in the frame 12. Reciprocably mounted upon the shaft 57 is a sleeve member 58 provided with a screw threaded portion 59 in threaded engagement with a section of the shaft 57. Integral with the sleeve member 58 is a projecting bifurcated member 60 adapted to engage one section 64 of a thrust bearing 63, an opposite section 65 abutting a collar 66. The bearing section 65 and collar 66 are mounted upon a shouldered sleeve 67 in turn reciprocably mounted upon the sleeve 39, the collar 66 resting against a shoulder formed upon the sleeve 67. The left end of the sleeve 67 is cup-shaped as indicated at 70 and mounted therein is a radial ball bearing 71. Surrounding the right end of the sleeve 67 between opposed faces of the collar 66 and cam sleeve 44 is a coiled compression spring 72. Extending into the central bore of the bearing 71 is a shouldered portion of a collet operating sleeve 73 which is reciprocably mounted at its left end in a journal indicated at 74. It will be noted that the left end of the sleeve 20 is journaled in the bore of the sleeve 73 at the right end thereof, while the right end of the sleeve as hereinbefore described is journaled upon the sleeve 23 and the latter in the bearing 24. The left end of the sleeve 73 engages a spring collet 75 of the usual type, and when reciprocated is adapted to cause the collet to alternateiy seize and release the left end of the piece of stock 10. Upon rotation of the cam 44 it will be apparent that the shaft 57 will be given a rocking movement, and through the threaded portion 59 in engagement with the threaded portion of the sleeve 58 the bifurcated member 60 will be reciprocated. The pitch of the threads formed upon the shaft 57 and sleeve 58 is such that sufficient longitudinal movement is given the member 60 during the slight rocking movement of the shaft 57 to operate the collet. The member 60 in moving toward the right to the position shown in Figs. 3 and 6 will through the intervening bearing 63 and collar 66 cause the spring 72 to be compressed, which thereby permits a weaker compression spring 78 surrounding the collet operating sleeve 73 and operatively engaging opposed flange faces provided upon the stationary bearing 74 and sleeve 73 to expand. The expansion of the spring 78 causes the sleeve 73 to move toward the right and consequently the bearing 71 and sleeve 67 will also move, thereby causing the collet in a well known manner to seize the stock 10 as shown in Fig. 3. The opening of the collet 75 by the cam wheel 44 and lever 50 and the closing thereof by the spring 78 permits the collet to grip stock varying slightly in diameter, as will readily be apparent. Upon a reverse movement of the member 60, the spring 72, which is stronger than the spring 78, expands and moves the collar 66 to the left and consequently the sleeve 67, bearings 63 and 71 and collet operating sleeve 73 will also move to the left and against the action of the spring 78, thereby causing the collet 75 to release the stock 10.

Slidably mounted within the bore of the sleeve 20 is an adapter sleeve 79 which is provided with a bore, the diameter of which is a trifle greater than the diameter of the stock 10 to readily permit the stock of be moved therealong in the operation of the apparatus. By providing a plurality of adapter sleeves 79 each with a different diameter bore formed therein, the apparatus may be readily adapted for different diameter stock to be cut. As indicated at 80 the collet 75 is rotatably secured to the driving sleeve 20 and a shoulder indicated at 81 formed upon the left end of the adapter sleeve 79 abutting the right end of the collet 75 adjacent the connection 80 forms a stop for the adapter sleeve 79 to limit its movement to the left. A reduced left end 82 of the adapter sleeve 79 extends into the collet 75 for a sufficient distance to properly support the stock 10 adjacent the cutting point. Suitable clearance is provided between the collet 75 and the end 82 of the sleeve 79 to permit the operation of the collet. A stop member 85 against which the stock is projected after each severing operation is reciprocably mounted upon a bracket 86 suitably supported upon the frame 12. The stop member 85 is adapted to be adjusted longitudinally to vary the distance between the cutting edge of the blade 53 and the end of the stop member 85 to provide for different lengths of stock severed, by a micrometer screw indicated at 87. Positioned below the stock 10 to be severed and at the left end of the apparatus is a multi-compartment receiver 88 having a vertical extending wall 89 which divides the bin into two compartments 91 and 92, the purpose of which will be described hereinafter. Suitable troughs (not shown) supported in an opening 93 formed in the plate 11 may be connected to each of the compartments 91 and 92 for directing the severed length of stock to suitable receiving bins (not shown).

Air under pressure is supplied from a suitable source (not shown) through a pipe 96 to a housing 97 at the right end of the apparatus, the housing 97 being carried by the frame of the motor 15. An air pressure gauge 98 of any usual type is included in the air supply line 96 to the housing 97, the primary reason for which will be made apparent hereinafter. The housing 97 is provided with a cap portion 99 provided with a tapered circular opening 100 which is centered with the longitudinal axis of the adapter sleeve 79 for entering the stock 10 therein. Hinged to the inside wall of the cap portion 99 is a flap door 101 which serves to seal the openig 100, upon positioning a length of stock 10 in the sleeve 79, from the escape of air under pressure supplied to the housing 97 as hereinbefore described. The air serves to cause the door 101 to close the opening 100 at all times except when inserting a length of stock 10 into the sleeve 79, at which time the operator merely centers the stock with the opening 100 and pushes it quickly therethrough where it comes to a stop against the stop member 85. As the end of the stock 10 passes the door 101 the door quickly drops into its sealing position as shown in Fig. 4 and the compressed air retains it therein. Suitable means indicated by the numeral 104 (Fig. 4) seals the housing 97 to the frame of the motor 15 to prevent the escape of air.

In order to insure the continuous severing of the stock as long as the apparatus is operating, means is provided for indicating to the operator when the length of stock last inserted in the apparatus is nearing the end of its movement therethrough so that another length of stock may be introduced. This is provided for in the following manner:

Referring to Fig. 3, it will be observed that the sleeves 20 and 79 adjacent their left ends and at diametrically opposite points, are provided with aligned openings 105 and 106, which upon the end of the stock 10 passing them, permit the passage of air therethrough and into a space indicated at 107 provided between the outside peripheral wall of the sleeve 20 and attached collect 75 and the inside wall of the bore in the sleeve 73 from whence it readily passes from the apparatus. The escape of air in this manner results in a drop in the air pressure as indicated upon the gauge 98 from its normal value, and the change in indication signifies to the operator that another length of stock 10 may be inserted in the apparatus.

It sometimes happens upon severing the last section from the stock 10 that a piece is left which is not the correct length and being too short to be seized by the collect it would drop into the compartment 92 which receives the severed sections of correct length. It is a feature of this invention to provide means for insuring that the defective or short lengths of stock shall be separated from the correct lengths of stock. This is accomplished by the means described below.

Referring to Figs. 7, 8 and 9, a valve is indicated at 108 which may be connected by a pipe 109 to a suitable source (not shown) for supplying air under pressure. The valve 108 is reciprocably mounted in a sleeve 112 fixed in a casing 113 integral with the frame 12 and is yieldably held in the position shown in Fig. 7 by a compression spring 114, the spring at its opposite ends rests against the end wall of the valve and a reduced portion 115 of a plug 116 threaded into the sleeve 112 at the right end thereof. The valve 108 is provided with a circular channel 117 which, in the position shown in Fig. 7, is in communication with ports 119 and 120 formed in the sleeve 112 and valve casing 113 respectively, the port 120 communicating with the pipe 109. Referring now to Figs. 2 and 8, the sleeve 112 is provided with another port 121 which lies in the same vertical plane as the port 119, and communicates with a pipe 122 fixed to the casing 113, by means of an elongated channel 123 (shown in dotted outline Fig. 2) formed in the periphery of the sleeve 112 and extending longitudinally thereof. In the position of the parts as indicated in Figs. 7 and 8 it will readily be apparent that compressed air will enter the port 120 from the pipe 109, pass through the port 119 and into the channel 117, through the port 121 along the channel 123 and into the pipe 122. Another port 126, as clearly indicated in Figs. 7 and 9, is provided in the casing 113 which communicates with a port 127 formed in the sleeve 112. In the operation of the apparatus the valve 108 is moved in a predetermined sequence to the right as viewed in Fig. 7 by the lever 50 until the channel 117 communicates with the port 127 as shown in Fig. 9, in which position compressed air will pass from the channel 117 through a port 128 and along an elongated channel 129 (shown in dotted outline Fig. 2) similar to the channel 123 and thence into a pipe 130 fixed to the casing 113. The pipes 122 and 130 are provided with nozzles 133 and 134 respectively, which as clearly shown in Fig. 2 are adapted to direct blasts of air horizontally and downwardly respectively, upon the stock projecting outside of the collect but at different periods, as will be explained hereinafter. It will be apparent that upon completion of the severing operation by the blade 53 a blast of air from the nozzle 134 will force the severed length of stock into the compartment 92, and that upon the end of the stock being fed toward the stop 85 and being too short to be gripped by the collect, a blast of air from the nozzle 133 will move the stock end in a horizontal direction toward the left as viewed in Fig. 2 whereupon it will be directed into the compartment 91. The operation of the nozzles 133 and 134 are in timed relation to the feeding and severing operations and will be fully described in the operation of the apparatus to be described hereinafter.

Another feature of this invention resides in the use of heated air for intermittently advancing the stock 10 to be severed which in the present instance comprises vulcanized rubber rods or tubes. The heated compressed air serves to heat the rubber rod during its intermittent advance toward the blade 53 to such a degree that the severing operation is greatly facilitated. The compressed air before being entered in the housing 97 as hereinbefore described is heated by suitable means, such as an electrically operated heater or hot plate, (not shown) which may be associated with the source of compressed air (not shown) or positioned at a point adjacent the entrance of the air into the housing 97.

The operation of this apparatus is as follows:

The stop 85 is first adjusted to the desired length of stock to be severed in the operation of the apparatus and an adapter sleeve 79 having a bore suitable for the particular rods or tubes 10 to be severed into short lengths is then inserted within the sleeve 20 with the shoulder 81 of the sleeve 79 abutting the collet 75. The cap 99 of the housing 97 is adapted to be readily removed to permit the mounting of the sleeve 79 as is readily apparent from the drawings. The apparatus is set in motion as hereinbefore explained by opening the needle valve 16 which causes the sleeve 20 carrying the collet 75 to be rotated at a high speed, the sleeve 20 being directly connected to the rotor of the air turbine motor 15. Through the sleeve 23 fixed to the sleeve 20, the gearing comprising worm 27, worm wheel 28, gears 30 and 31 and spiral gears 35 and 36, the sleeve 39 will be caused to continuously rotate at a suitable speed which is slower than the speed of the sleeve 20. The cam faces 45 and 46 are thereby set in motion in the direction indicated in Fig. 7 to cause the shafts 51 and 57 to oscillate in a predetermined sequence to cause the operation of the cutting blade 53 and collet 75 and the air blast valve 108, respectively. Heated compressed air is then permitted to enter the housing 97 through the pipe 96 and compressed air is also supplied to the pipe 109 from suitable source of supply as hereinbefore explained. The apparatus is now ready for operation and the operator inserts in the sleeve 79 in the manner heretofore described one or more pieces of stock 10 as clearly shown in Fig. 3. Referring now to Fig. 7 with the cam faces 45 and 46 of the cam wheel 44 in the positions shown, the first step in the cycle of operations will be the closing of the collet 75 to grip the rod 10 which has been moved against the stop 85 by the heated compressed air entering the housing 97. As the lever 50 rises upon the cam face 46 the shaft 57 will be rocked in a counter-clockwise direction and through the thread 59 thereon and associated threaded sleeve 58, the member 60 will be moved toward the right (Fig. 3) and in the manner hereinbefore described cause the collet to be closed upon the rod 10. Upon the lever 50 reaching the end of its rising movement upon the came face 46 it will have operated the valve 108 due to its engagement therewith as shown in Fig. 7 to connect the port 126 with the pipe 130 (Fig. 9) provided with the nozzle 134 and thereby cause a blast of air to be directed downwardly upon the rod 10 intermediate the stop 85 and collet 75. In the continued rotation of the cam wheel 44 the shaft 51 will be rocked in a counter-clockwise direction due to the movement of the lever 49 in dropping into the low point of the cam surface 45 assisted by the spring 54 as hereinbefore explained. This movement of the shaft 51 causes the cutting blade 53 to engage the rapidly rotating rod 10 and sever a section therefrom, and due to the blast of air emitted by the nozzle 134 the severed section will be forced downwardly into the compartment 92. The cam surface 45 then causes the lever 49 to move outwardly thereby rocking the shaft 51 in a clockwise direction and returning the cutting blade 53 to its normal position as shown in Fig. 2. In a predetermined sequence the lever 50 will ride onto the low point of the cam face 46 assisted by the spring 114 and thereby rock the shaft 57 in a clockwise direction and in a manner reverse to that described heretofore during the counter-clockwise movement thereof, causing the collet 75 to open and release its grip upon the rod 10 which instantaneously is projected toward the left (Fig. 3) and against the stop 85 due to the compressed air continually pressing upon the left end thereof. Simultaneously with the opening of the collet the valve 108 will have moved to the position shown in Figs. 7 and 8, whereupon the port 120 will be in communication with the pipe 122 provided with the nozzle 133 and thereby cause a blast of air to be directed horizontally upon the rod 10. If the section of rod happens to be the end of the rod it will pass through the collet, and not being supported thereby it will be projected horizontally across the top of the compartment 92 by the air blast and striking a deflecting wall 137 (Fig. 2) will drop into the compartment 91. This comprises one complete cycle of operation and brings the parts back to the positions shown in Fig. 7 where, in the continued rotation of the cam wheel 44, the next stop will be the closing of the collet 75 as before described.

As the rod or rods 10 are fed toward the left (Fig. 3) during the severing thereof, the right end of the last rod will ultimately pass the openings 105 and 106 formed in the sleeves 20 and 79 respectively and permit air to escape therethrough and into the space 107 between the sleeve 20 and collet 75, and thence to atmosphere. This release of air is immediately indicated upon the gauge 98 and signifies to the operator that the sleeve 79 needs reloading.

While the stock 10 shown inserted in the apparatus consists of a plurality of rods of substantially cylindrical form, it is to be understood that stock in tube form would be handled in a substantially identical manner. Also stock having a noncircular cross-section may be worked by providing adapter sleeves with suitable bores.

The use of heated compressed air for propelling the rods composed of vulcanized rubber or other material affected by heat through the apparatus softens them to such a degree that the severing operation is greatly facilitated and prevents chipping thereof.

By using the above described apparatus embodying the features of this invention for severing vulcanized rubber rods into lengths, great efficiency in operation and rapidity of production are attained along with uniformity in the finished product.

What is claimed is:

1. In apparatus for advancing and severing an article, a passageway for guiding an article, means for projecting a gaseous medium into the passageway against the article, means for stopping the article upon a predetermined advance, severing means, means for causing a relative movement between the severing means and the article to sever the latter, means for projecting a gaseous medium against the severed section of the article to cause a movement thereof in a predetermined direction upon completion of the severing operation, and means for causing the severing operation and the projection of the gaseous medium against the severed section in timed relation to each other.

2. In apparatus for intermittently advancing and severing an article, a passageway for guiding an article, means for projecting a gaseous medium into the passageway against the article, means for stopping the article upon a predetermined advance from said passageway, severing means, means for causing a relative movement between the severing means and the article to sever the latter, and means for projecting a gaseous medium against the periphery of the article during its advance to said stop to project a section of the article which is shorter than the severed sections of predetermined length in a direction away from the path taken by the severed sections, thereby separating the short section from the severed sections.

3. In apparatus for intermittently advancing and severing vulcanized rubber rods, a passageway for guiding a rod, means for seizing and rotating the rod upon a predetermined advance thereof, means for severing a predetermined length therefrom, means for causing said rod seizing and rotating means to release the rod, means for operating said rod seizing, severing and releasing means in timed relation to each other, and means for continually projecting a heated gaseous medium into the passageway against the rod to simultaneously heat and advance it to a severing position, the heated gaseous medium sufficiently changing the condition of the rod to facilitate the severing thereof.

4. In apparatus for advancing and severing an article, a passageway for guiding an article, means for projecting a heated gaseous medium into the passageway against the article to simultaneously heat and advance it to a severing position, article severing means, and means for subsequently causing a relative movement between the article and the severing means to sever the article while still in a heated condition.

In witness whereof, I hereunto subscribe my name this 17 day of October, A. D. 1925.

JOSEPH WILLIAM FAY.